(12) United States Patent
Chapman et al.

(10) Patent No.: US 6,192,231 B1
(45) Date of Patent: Feb. 20, 2001

(54) TELEPHONE APPARATUS

(75) Inventors: Ian David Chapman, West Wickham; Stephen John Buttery, Manningtree; Simon Walker, London, all of (GB)

(73) Assignee: British Telecommunications public limited company, London (GB)

( * ) Notice: Under 35 U.S.C. 154(b), the term of this patent shall be extended for 0 days.

(21) Appl. No.: 09/068,225

(22) PCT Filed: Jul. 7, 1997

(86) PCT No.: PCT/GB97/01850

§ 371 Date: May 5, 1998

§ 102(e) Date: May 5, 1998

(87) PCT Pub. No.: WO98/03004

PCT Pub. Date: Jan. 22, 1998

(30) Foreign Application Priority Data

Jul. 11, 1996 (GB) .................................................. 96305370
Jul. 11, 1996 (GB) .................................................. 96305600

(51) Int. Cl.$^7$ ..................................................... H04M 9/00
(52) U.S. Cl. ........................ 455/401; 455/417; 379/210; 379/252; 379/418; 379/424
(58) Field of Search .................................. 455/401, 417, 455/466, 31.2, 412, 455, 421, 463, 413, 415; 379/201, 210, 211, 212, 214, 251, 252, 418, 423, 424, 373, 375

(56) References Cited

U.S. PATENT DOCUMENTS

| 4,741,019 | 4/1988 | Takahashi . |
|---|---|---|
| 4,776,000 | 10/1988 | Parienti . |

(List continued on next page.)

FOREIGN PATENT DOCUMENTS

| 0115240 A1 | 8/1984 | (EP) . |
|---|---|---|
| 0129843 A2 | 1/1985 | (EP) . |
| 0236180 A1 | 9/1987 | (EP) . |
| 0301573 A2 | 2/1989 | (EP) . |
| 0304998 A2 | 3/1989 | (EP) . |
| 0342707 A2 | 5/1989 | (EP) . |
| 0330856 A2 | 9/1989 | (EP) . |
| 0433465 A1 | 6/1991 | (EP) . |
| 0445887 A2 | 9/1991 | (EP) . |
| 0571291 A1 | 11/1993 | (EP) . |
| 0608654 A1 | 8/1994 | (EP) . |
| 0387313 B1 | 4/1995 | (EP) . |
| 0712230 A2 | 11/1995 | (EP) . |
| 0740482 A1 | 10/1996 | (EP) . |
| 2279209A | 12/1994 | (GB) . |
| 2286093A | 8/1995 | (GB) . |
| 2287856A | 9/1995 | (GB) . |
| 2297455A | 7/1996 | (GB) . |
| 404301954 | 10/1992 | (JP) . |
| 404336835 | 11/1992 | (JP) . |
| WO 90/00844 | 1/1990 | (WO) . |
| WO 90/03068 | 3/1990 | (WO) . |
| WO 92/04798 | 3/1992 | (WO) . |
| WO 93/16549 | 8/1993 | (WO) . |
| WO 93/26132 | 12/1993 | (WO) . |
| WO 94/01976 | 1/1994 | (WO) . |
| WO 96/07286 | 3/1996 | (WO) . |

OTHER PUBLICATIONS

PATENT ABSTRACTS OF JAPAN, vol. 018, No. 428, 10 Aug. 1994 & JP–A–06 133058.
PATENT ABSTRACTS OF JAPAN, vol. 95, No. 009 & JP–A–07 240960, 12 Sep. 1995.

*Primary Examiner*—Nay Maung
*Assistant Examiner*—Quochien B. Vuong
(74) *Attorney, Agent, or Firm*—Nixon & Vanderhye P.C.

(57) ABSTRACT

A telephone apparatus connects to a telecommunications network via an exchange line. It has signal recognition for detecting and recognizing calling line identity (CLI) and called number identity (CNI) signalling transmitted over the exchange line. The apparatus causes an incoming call to be transferred to a second exchange line in response to specified CLIs and/or CNIs.

18 Claims, 4 Drawing Sheets

U.S. PATENT DOCUMENTS

| | | |
|---|---|---|
| 4,802,200 | 1/1989 | Murata et al. . |
| 4,905,272 | 2/1990 | Van De Mortel et al. . |
| 4,980,907 | 12/1990 | Raith et al. . |
| 5,058,151 | 10/1991 | Tanaka et al. . |
| 5,109,405 | 4/1992 | Morganstein . |
| 5,142,569 * | 8/1992 | Peters et al. .......................... 379/373 |
| 5,210,785 | 5/1993 | Sato et al. . |
| 5,313,516 | 5/1994 | Afshar et al. . |
| 5,363,426 | 11/1994 | Nyhart . |
| 5,375,161 | 12/1994 | Fuller et al. . |
| 5,465,397 | 11/1995 | Pickert . |
| 5,469,496 * | 11/1995 | Emery et al. .......................... 455/445 |
| 5,473,671 | 12/1995 | Partridge, III . |
| 5,502,761 * | 3/1996 | Duncan et al. ....................... 455/412 |
| 5,563,932 * | 10/1996 | Tachibana et al. ................... 379/373 |
| 5,563,935 * | 10/1996 | Small ................................... 379/373 |
| 5,563,943 * | 10/1996 | Takebayashi et al. ............... 379/373 |
| 5,577,101 | 11/1996 | Bohm . |
| 5,577,104 * | 11/1996 | Knuth et al. ......................... 379/373 |
| 5,579,383 | 11/1996 | Bales et al. . |
| 5,644,629 | 7/1997 | Chow . |
| 5,668,852 * | 9/1997 | Holmes ................................ 455/31.2 |
| 5,673,308 | 9/1997 | Akhavan . |
| 5,689,549 | 11/1997 | Bertocci et al. . |
| 5,696,817 * | 12/1997 | Yatsu ................................... 379/373 |
| 5,751,800 | 5/1998 | Ardon . |
| 5,768,356 * | 6/1998 | McKendry et al. ................. 379/201 |
| 5,771,453 | 6/1998 | Haartsen . |
| 5,805,680 | 9/1998 | Penzias . |

\* cited by examiner

TELEPHONE APPARATUS

This invention relates to telephone apparatus, and in particular to customer premises equipment (CPE) for use in supporting an enhanced service to the customer. The invention has particular application for a service allowing a user to use both a cordless or fixed telephone system and a cellular telephone system interchangeably, efficiently and flexibly, without the need for complex procedures.

RELATED ART

The essential distinction between a cordless system and a cellular system is that in general a cordless handset works in conjunction with a specific radio base station connected to a fixed telecommunications exchange line, whilst a cellular handset will communicate with whichever of a number of radio base stations currently provides the best radio link. Cellular systems require handover of a handset from one base station to another as the handset and its user move around the coverage area. Some large scale cordless systems, known as 'Wireless PBX', offer conventional private exchange services and allow use of a handset with different base stations within a small defined area such as a single building or campus, but incoming calls are always routed to the same (fixed) exchange line.

If a user has access to both cordless and cellular systems it is preferable for the user to use the cordless system dedicated to him whenever possible, so that the available capacity of the cellular system can be used by other users, and because cordless systems are simpler and therefore less expensive to provide. The cordless system may also offer features not available in the cellular network. Cordless and cellular handsets both generally operate using radio communication but other wireless communication media such as ultrasound or optical signals (e.g. infrared) are sometimes used, and the term "wireless" as used in this specification embraces any such communication medium.

It will be seen from the foregoing that cordless systems have some features in common with truly "fixed" systems and some in common with fully "mobile" systems such as cellular systems.

Dual purpose cellular/cordless handsets capable of operating on both cordless and cellular systems have been developed. Examples are described in GB2225512, WO93/16534, WO93/16348, WO93/16549, WO93/16560 and WO94/00946 (all Motorola), EP 0660626 (Nokia), and WO95/01070 (Ericsson). Some of these automatically switch between cordless and cellular operation. according to which type of base station can be detected by the mobile unit. However, for incoming calls the user of such a handset must have two teiephone numbers; one for each system, and the user must arrange that calls mace to the number corresponding to the system on which the user is currently not operating are nevertheless answered, for example by setting up a call diversion to the other number. Alternatively, if the exchange line has another apparatus attached (such as another cordless handset, or an answering machine), it may be more appropriate not to divert incoming calls, but to continue to route them to the exchange line. For example, as well as the handset, the user may have an answering machine connected to the exchange line, and he or she may wish calls to be answered by that if the handset is out of range. It can be difficult for a user to decide whether to divert incoming calls to the cellular number, (thereby incurring extra call charges for the diversion and also effectively disabling the exchange line such that it cannot be used by anyone else for receiving calls); or not to divert them (thereby becoming unable to receive urgent calls on the cellular telephone).

Telephone equipment is known, for example from U.S. Pat. No. 4,926,470 (Sanford), and International Patent Application WO94/23526 (SNI Innovation), in which incoming calls are handled differently according to characteristics, recognised by the equipment, which identify the caller or the intended called party, and connect the call to an appropriate extension line. However, even if one or more of the extensions were a dual mode handset, such equipment would not be able to contact it if it were to go into cellular mode as in that mode the handset is not an extension of the same exchange line, but is operating as a completely different exchange line—indeed usually on a different network. If call diversion to the cellular number is activated, all incoming calls would be diverted by the PSTN and thus they would not be received by the call handling equipment, which could therefore play no part in the call routing decisions.

A service known as "Called Number Identity" (CNI) is now being introduced by some telecommunications operators, in which more than one different telephone number is served by the same exchange line and, in order to identify to the called party the number that has been dialled, the exchange arranges that the ringing tone varies in a characteristic way according to which number has been dialled. This is known as "ringing cadence". For example, if the number dialled is the "primary number" the exchange may cause ringing current to be transmitted in a "double ring", repeated periodically as is conventional in telephone systems in for example the United Kingdom, whereas if the "alternative number" is dialled a single ring, repeated periodically, (as is conventional in the United States and some European countries) is initiated by the exchange. Other ring cadence variations may be used; for example patterns of short and long rings, triple rings, etc. The called party, on hearing the ringing pattern or cadence, will recognise which number has been dialled and therefore the type of call which is being made; for example the numbers could be allocated to different members of the household, or alternatively they may be a business and domestic (private) number for the same person. This allows the user to decide who (if anyone) should answer the call. For example, if the ringing cadence relates to the user who is absent, the users who are present may choose to let the telephone ring, perhaps to allow an answering machine to take any message.

SUMMARY OF THE INVENTION

According to the invention there is provided a telephone apparatus having exchange connection means suitable for connection, by means of a telecommunications exchange line, to a telecommunications network; signal recognition means suitable for detecting and recognising a ringing pattern or cadence of signalling, associated with an incoming call, transmitted over the exchange line to the apparatus, and call handling means for handling the incoming call according to the ringing pattern or cadence.

According to a second aspect, there is provided a method of operating a telephone apparatus connected to a telephone network by means of an exchange line, wherein on an incoming call attempt being made from the network, the call is handled according to a selected one of a plurality of modes under the control of the apparatus according to which of a predetermined set of ringing patterns or cadences is transmitted from the network.

The ringing cadence may be generated by the network according to which of a plurality of numbers associated with the exchange line was used to make the call. By arranging for calls to be routed according to these characteristics, selective routing of incoming calls can be arranged such that some calls may be answered, others routed to an answering machine, and others transferred, for example to a user's cellular number.

The call handling means may include means for transferring the incoming call to a second exchange line in response to the recognition of a predetermined ringing pattern or cadence. The transfer may be achieved by transmitting a signal to the telecommunications network in order to disconnect the incoming call from the exchange line, and transmitting a signal over the exchange line to the telecommunications network, the signal being indicative of the second exchange line to which the call is to be transferred. The handling means may alternatively cause a signal to be transmitted over the telephone network to a predetermined telephone connection in response to an incoming call. The apparatus may be connected to a telephone answering machine, and comprise means for causing an incoming telephone call to be handled by the telephone answering machine, and signal generation means for causing a signal to be transmitted over the telephone network to a predetermined receiving telephone connection in response to a call being routed to the machine. This signal may be an 'SMS' data message for transmission to a GSM cellular telephone, giving indications of any one or more of the calling party, the called number, the duration of the message, and the time at which the incoming call was made.

The apparatus may have a cordless handset connection means suitable for establishing wireless communication between the apparatus and a respective handset or handsets, detection means for detecting the presence or absence of such handsets, and programming means to change the correspondence between ringing patterns or cadences and routing selection according to the presence or absence of the handsets.

The system may be programmable such that the correspondence between signal characteristics and routing selection can be varied, and the programming means may include caller control means, the caller control means comprising option selection means to select from two or more routing options, selected according to the characteristics of the signalling received, message generation means for transmitting an option message over the exchange connection to the maker of an incoming call offering the options selected by the option selection means, detection means for detecting signals received from the exchange connection in response to the option message, and means for controlling the routing selection means in response to the signals detected by the detection means.

BRIEF DESCRIPTION OF THE DRAWINGS

An embodiment of the invention will now be described with reference to the accompanying drawings, in which.

DETAILED DESCRIPTION OF EXEMPLARY EMBODIMENTS

This embodiment also incorporates the invention of our co-pending international application PCT/GB97/01848, published as WO98/03002, which has the same filing date as this application (corresponding to U.S. patent application Ser. No. 09/029,840 filed Mar. 9, 1998).

Figure 1:
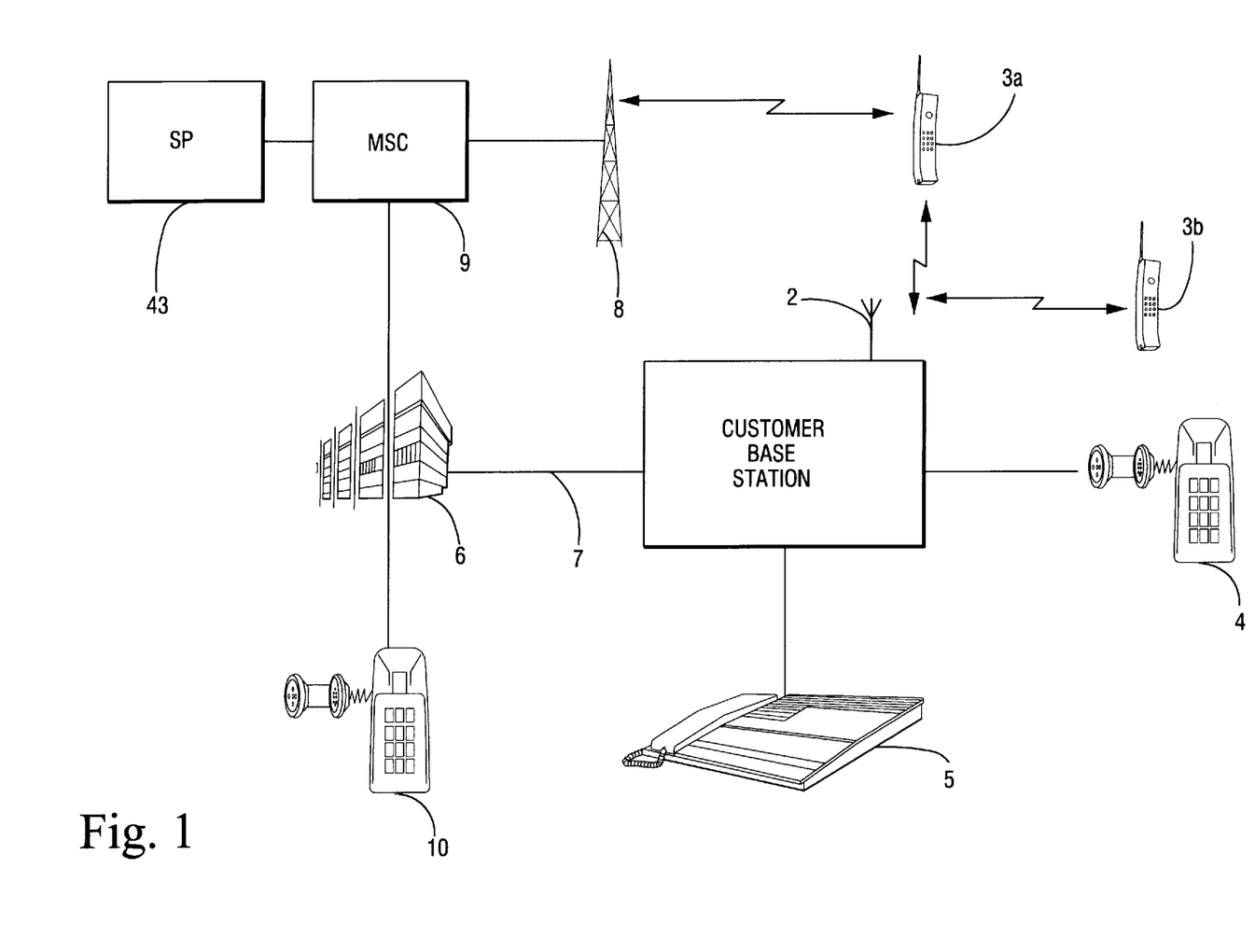
FIG. 1 shows a customer premises equipment (telephone apparatus), and associated telephone handset and exchange lines, according to the invention.

FIG. 1 shows a customer base station apparatus 1 according to the invention having a radio antenna 2 for communication using a cordless protocol with mobile stations 3A, 3B and fixed connections to a fixed telephone instrument 4 and an answering machine 5. The apparatus 1 is connected by means of a fixed exchange line 6 to a conventional public switched telecommunications network (PSTN) 7. For incoming calls over the line 6 two separate directory numbers, referred to hereafter as the "primary number" and the "alternative number", are available. The mobile units 3a and 3b may also communicate (as shown for mobile unit 3a) with a cellular radio system using a cellular protocol such as GSM (Global System for Mobile Telecommunications) by means of a base transceiver site 8 (BTS) and a mobile switching centre (MSC) 9 which is connected to the fixed switching system 7. A service point 43 is also connected to the mobile switching centre 9. Incoming calls can be made to the users of the equipment 1 by callers such as caller 10 connected to the switched telecommunications system 7 (or indeed the mobile system 9) in the conventional way. The handset 3a also has a telephone number in the cellular system, referred to hereinafter as the "remote number".

Figure 2:
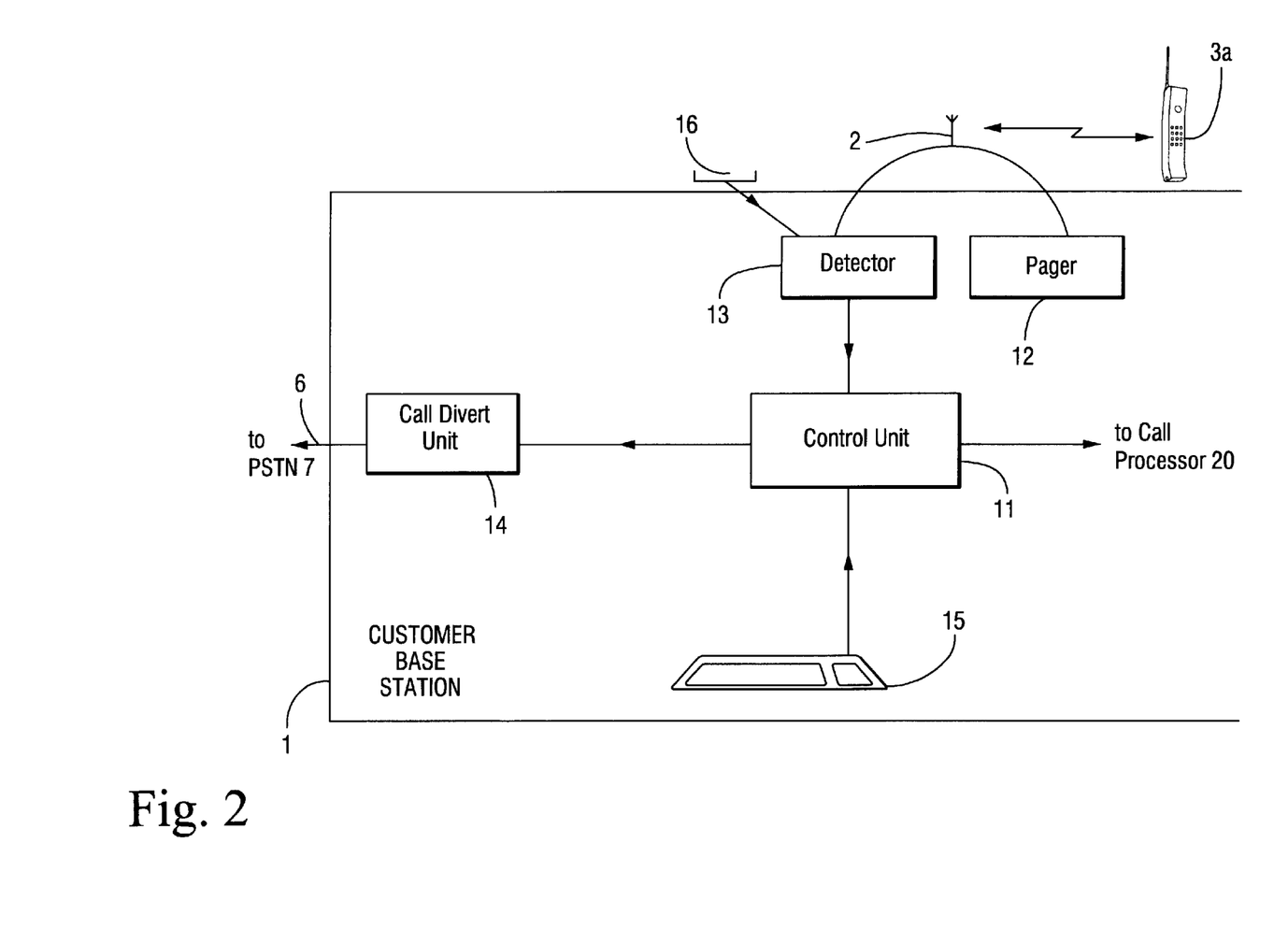
FIG. 2 shows a controller and ancillary equipment forming part of the telephone apparatus of FIG. 1.

FIG. 2 shows in more detail part of the telephone apparatus 1, specifically a control unit 11. The control unit 11 has input from a cordless handset detector 13 and from a manual input unit (here embodied as a keyboard 15). Although illustrated here as a separate unit, the manual input may be provided using the keypad of one of the telephones 3a, 3b, 4. The detector 13 in turn has input from a cordless handset cradle 16 and from the radio antenna 2. A pager unit 12, for transmitting paging signals to the cordless handsets through the antenna 2 is also provided. The control unit 11 has two outputs, firstly to a call divert unit 14 which in turn has an output to the PSTN 7 by way of exchange line 6. The second output from the control unit 11 is to a call processor unit 20 shown in FIG. 3.

Figure 3:
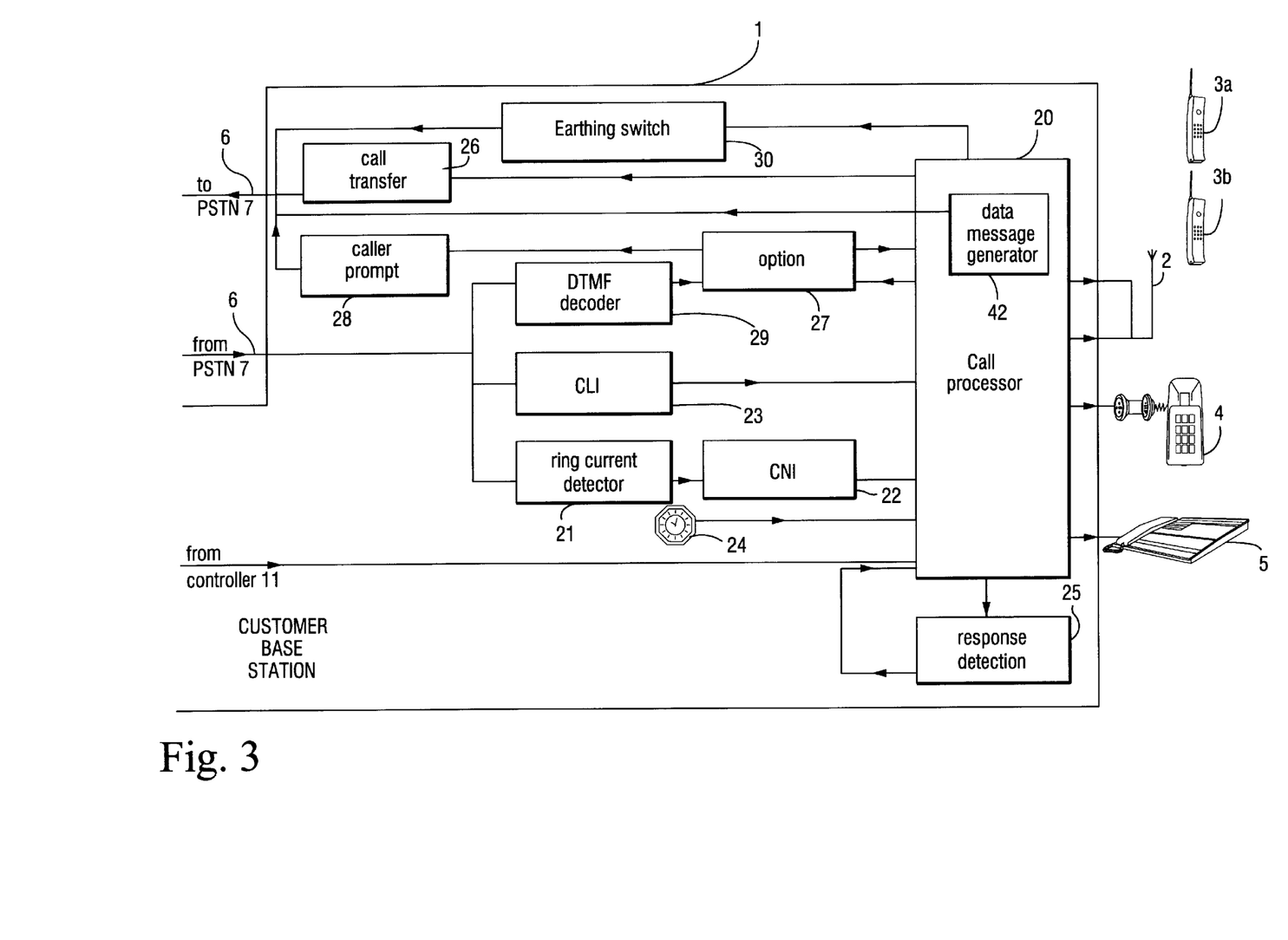
FIG. 3 shows a call processor and ancillary equipment also forming part of the telephone apparatus of FIG. 1.

FIG. 3 shows the call processor unit 20 and various ancillary units which also form part of the apparatus 1. As well as the aforementioned input from the control unit 11, the call processor unit also has a called number identity (CNI) unit 22 and a calling line identity (CLI) unit 23, both of which detect incoming signals from the exchange line connection 6. In the former case, the exchange line 6 feeds a ringing current detector 21, which identifies the presence of ringing current and passes a signal indicative of the ringing current to the called number identity unit 22.

The call processor 20 is selectively connectable to the antenna 2, telephone 4 and answering machine 5 for routing incoming calls, in response to the various inputs to the call processor.

The call processor 20 is under control of a clock 24. The call processor 20 is also associated with a response detection unit 25, which returns an input to the call processor 20. The call processor 20 also has an output to a call transfer unit 26, which in turn has an output to the exchange line 6.

The call processor 20 also has an output to an option processor 27 which in turn has an output to a caller prompt generator 28 which itself has an output to the exchange line 6. A further input from the exchange line 6 leads to a DTMF decoder 29 which in turn feeds back to the option processor 27 to provide a further input to the call processor 20.

The call processor unit 20 also controls an earthing switch 30 which causes one or other wire of the PSTN connection 6 to be connected to "earth" (zero) potential, thereby simulating the operation of the "recall" button on a conventional telephone. As will be described below, this switch may be replaced by a generator of a 'loop disconnect' signal, or any other signal recognisable as a "recall" instruction by the PSTN 7.

The call processor 20 also includes a data message generator 42, to be described with reference to FIG. 4, which has an output to the PSTN 7.

Figure 4:
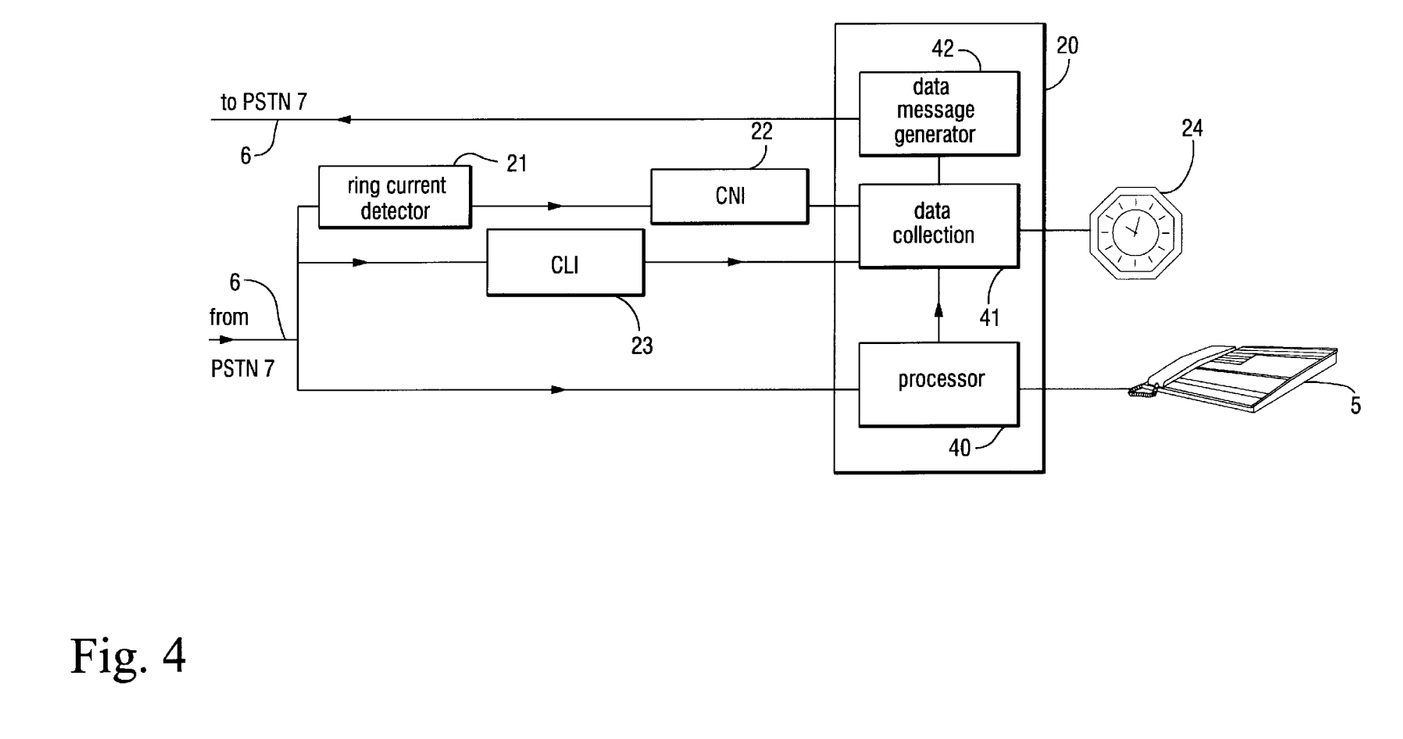
FIG. 4 shows the elements for generating a data message, in response to a call being made.

FIG. 4 shows certain elements of the processor 20 and their interaction with the input signal detectors 22, 23. Incoming calls from the exchange line 6 are routed, through a processor 40 (forming part of the call processor 20), to an answering machine 5. A handset may also be connected, using which a user may intercept the call before the answering machine responds. The processor 40, on detection of acquisition of the call by the answering machine 5, controls the data collection unit 41 which obtains data from the called number identification unit 22, the calling line identifier 23 and the clock 24 for passing to the data generator 42 which generates a data message for transmission by way of the exchange line 6.

Telephone network services are being developed which allow several users to make use of the same exchange line and for the various users of the service to have personalized services although sharing the same line. The call handling unit 1 is designed to make use of these services, in many cases operating them automatically instead of by means of user input, in order to provide additional services, and in particular to allow call diversion, selective call transfer and other call handling functions to be performed in response to the nature of incoming calls, with minimal additional input from the user himself. In particular the system is designed to allow the user of a dual mode cordless/cellular handset to be reachable by the same telephone number whether he is within range of his cordless base station or not, but by the most economical route, without complex inputs by either the called or calling party. The system also allows the user to handle individual calls in a manner most appropriate to the nature of the calling and called parties automatically, without the need for any specialised input from the user once the system has been configured to the user's individual requirements.

The call handling unit 1 described below operates in conjunction with conventional cordless and/or fixed handsets, and a conventional answering machine 5. However, if preferred the answering machine functionality may be incorporated within the call handling unit 1. Further telephone apparatus may be connected to the exchange line 6 in parallel with the unit 1. In one possible arrangement, the call-handling unit 1 replaces the base station of a conventional domestic cordless system, connected in parallel with one or more fixed telephones. In this arrangement the fixed telephones would not be controlled by the unit 1.

The call handling unit 1 is intended to work with existing public switched telephone networks and cellular radio networks, using network services which already exist or have been proposed for introduction in the near future. A telephone network operator would therefore offer the call handling unit 1 and a suitable package of its existing network services in order to provide all the necessary functionality. Called Number Identity (CNI) has already been described. Other such network services will now be described.

Calling Line Identity (CLI)

A service whereby a signal, indicative of the origin of a call, is transmitted by the network to the called number. Apparatus suitable for converting these signals for display of the caller's identity can be provided, giving the called party the ability to identity a caller and to choose whether to answer the call, greet the caller by name when answering, or (if the apparatus stores the display after the caller has rung off) to return a call if the called party is unable to answer it at the time it is made. Systems have been developed which allow the use of "Calling Line Identity" (CLI) to determine whether a call is to be answered, and which handset to ring of several wired to a control unit. An example of such a system is disclosed in International Patent Specification no. WO95/23526 (SNI Innovation). However, this only allows calls to be routed to selected handsets connected to the routing apparatus, for example to ensure that incoming calls are routed to specified extensions, for example to avoid disturbance to users of the other extensions. in rooms which are currently occupied.

Call Diversion

A network service in which a user can divert incoming calls to another number by programming the exchange to reroute the calls, for example by transmitting DTMF (dual tone multiple frequency) tones by means of keystrokes on his telephone keypad. When the service is activated, the PSTN routes all incoming calls to the new number Call Transfer In this service an incoming call made to an exchange line is intercepted, such that the called party can arrange for the calling party to be connected to a third party, the original connection then being released. This service is commonly provided in private exchanges (PBX), in order to allow incoming calls to be transferred from one extension line to another. In general the transfer is effected by "parking" the incoming call using an earthing key (usually known as the "recall" button), and then dialling the new number. Normally this takes place whilst the call is in progress (i.e. after the call has been answered), but in the present embodiment the apparatus is arranged to carry out the transfer as soon as the connection to the called party is made, and before ringing tone is applied to the handset. Call Transfer is distinct from Call Diversion in that Call Diversion causes all incoming calls to be intercepted by the exchange and routed directly to the remote number, without the involvement of the exchange line associated with the number dialled. Call Diversion involves less signalling overhead, and will operate even if the line is already in use, but it is less versatile as it does not permit the called party to select different treatment for different calls.

The term "routing", as used in this specification, generally includes both call transfer and call diversion, and It also embraces the connection of a call by a base station to one or other of the apparatus associated with it (e.g. an answering machine or a cordless handset). However, individual embodiments need not be capable of supporting all such functions.

The detailed operation of the system will now be described. The generation by the control unit 11 of call handling settings to be used by the processor 20 will be described first. A user input 15 (illustrated as a keyboard) allows the user to programme the call processor 20 to handle different types of call in different ways according to a number of criteria which the user may wish to apply. For example the user may wish to distinguish between incoming calls made on the "primary" number and those made on the "alternative" number (which the call processor 20 can distinguish by the different ringing cadences as will be described), or by the identity of the caller making the call (using CLI). The user may wish to select that the only calls to be routed to the cellular telephone number when the mobile station 3a is not within range of the cordless base station apparatus 1 are those directed to the primary number and originating from certain selected directory numbers. This would ensure that only business calls from certain selected callers would reach him: less urgent calls, and calls intended for other users or other handsets, being handled by the base station e.g. by being routed to an answering machine 5. Routing to directory numbers other than the user's own cellular telephone number is also possible. The user input 15 may be used to programme the controller on a real-time basis when the user takes his handset out of, or back into, range of the base station 1. However it may also be programmed in advance, either to operate on a regular time of day/day of week basis (for instance routing business calls to the answering machine outside business hours, or maybe according to a predetermined schedule depending on the known future schedule of the user. The user input 15 may also be used to configure that certain categories of call (for instance a specific CLI) is not to be answered at all. This would be useful for example as an automatic screening of nuisance calls from a known source.

The table below shows an exemplary pattern of call handling which may be programmed into the call processor 20 by means of the control unit 11 and user input 15. For illustrative purposes, the "primary number" may be considered to be the user's business number and "alternative number" the user's private number, but they may be used in any other way that the user requires, for example to identify calls to different household members.

| CLI | CNI→ | |
| --- | --- | --- |
| ↓ | PRIMARY NUMBER | ALTERNATIVE NUMBER |
| Category 1 | Follow handset 3a | Any handset on base |
| Category 2 | Handset 3a if on base | Handset 3b if on base |
| Category 3 | No answer | No answer |
| Default | Answering machine | Any handset on base |

Four categories of calling line identity are identified in Table 1, identified as "category 1", "category 2", "category 3" and "Default". "Default" is used for any Calling Line Identity not specifically identified under any of the other categories.

Category 1 CLIs may be for example business associates whom the user of the primary number wishes to be able to reach him using his cellular telephone 3a even if he is away from base. In this case the call processor 20 will be programmed such that if the handset 3a is not detected by the detector 13. as will be described below, the call is transferred by way of the PSTN and the mobile network 8 and 9 to access the user handset 3a on the remote number by means of the cellular network. However, the associates may also wish to contact the location rather than the person and they may do this by dialling the "alternative number" instead of the "primary number".

For Calling Line Identities in Category 2, the primary number and alternative number are used in this example to contact different members of the household etc, by ringing different handsets.

Category 3 is, for example, the Calling Line Identity of a known nuisance caller from whom none of the users wish to answer any calls. In existing systems, a user could use a Calling Line Identity display to determine whether to lift the receiver, but the telephone would nevertheless ring. The called party has to check the CLI display before answering the call, and an answering machine, if fitted, would answer the call if the user does not pick it up. However, even the mere knowledge that a nuisance caller is attempting to call can be very distressing to the victims of such calls. In the described embodiment the system would not route the call to any handset (or other device such as the answering machine 5), and would simply present the caller with ringing tone, without the called party even being aware of it.

Finally, there is a default condition for Calling Line Identities not falling into any of the specified categories, and here again the default condition may be routed differently according to whether the "primary number" or "alternative number" is dialled.

The settings set by the control unit 11 may include a hierarchy of conditions for use in turn, in the event that the preferred condition shown in Table 1 is not answered. In each case the hierarchy should eventually finish at either the answering machine or "no answer". It should also be recognised that Table 1 shows the settings at a particular time. The controller may be set to programme the call processor to vary the settings according to a predetermined schedule which may be a diary system or a regular "time of day" schedule. For example all calls may be routed to the answering machine during the night.

The control unit 11 has a second input from a handset detector 13. This allows the controller to set the call processor 20 to answer calls or divert them to the cellular number according to whether the dual mode handset 3a is within range of the cordless base station antenna 2.

A paging system is used to determine whether the handsets 3a, 3b are within wireless communication range of the cordless base station antenna 2. This is an adaptation of the known cordless paging systems which operate when a call attempt is being made to or from the handset. In this modified arrangement the pager 12 causes an interrogation signal to be sent periodically, whether or not a call attempt is being made, which the handset will respond to in the normal way if it is in within range. The detector 13 determines whether the signal from the pager 12 has been responded to, and if the handset is newly absent, or newly present it initiates or cancels call diversions accordingly. In order to avoid frequent resetting of the call diversion system on and off, which may occur if the handset 3a is close to the limits of range of the base station 2, the call routing function may be arranged to be initiated by the control unit 11 only if a predetermined number of consecutive pagings, for example three, achieve the same response.

The paging rate may be increased if a change is detected, to allow such consecutive pagings to take place over a shorter timescale than would otherwise be the case, this identifying a change more quickly. The paging rate may also be varied according to the detected signal level, so that if a handset is close to the limits of the range, and this likely to make a transition, that transition is identified more readily.

The detector 13 may have a second mode of operation, in which it can detect the presence of the handset 3a in a cradle 16. If the base station has more than one associated handset the detector 13 can be arranged to identify which handsets are present. The cradle 16 may be arranged to identify each individual handset. The cradle 16 may also serve as a battery charger for the handset 3a, and one possible way in which the recognition of the handset may be achieved is by providing a different configuration of electrical connections on each handset 3a, 3b, compatible with different terminals on the cradle 16, such that the cradle can detect which of its terminals are connected to the handset 3a or 3b, and therefore which handset is in the cradle 16.

There may be more than one cradle 16, to allow several handsets to be stored, or their batteries charged, simultaneously. Each handset may have its own dedicated cradle, so that occupancy of a given cradle indicates the presence of its respective handset. Alternatively, each cradle may be able to accommodate any handset, and have means as described above for identifying the handset currently occupying it.

It is, of course, possible to arrange that the handset continues to be paged by the wireless system whilst it is in the cradle. Alternatively the cradle may be arranged to detect whether it is occupied, the handset being paged when it is first put into the cradle and, once it responds, its presence in the cradle being then inferred as long as the cradle remains occupied. Paging would be resumed when the cradle is vacated.

The controller 11 compiles its instructions to the call processor according to both the manual input from the input device 15 and the output of the detector 13. If all calls intended for the "primary number" are to be diverted to the cellular number when the cordless handset is not detected, the controller 11 sets up a call divert using a call divert unit 14 to transmit the necessary DTMF signals to instruct the exchange in the PSTN 7 that calls to the "primary number" of the relevant handset are to be diverted to the "remote number", which is the cellular directory number associated with the handset 3a. Calls intended for the "alternative number" remain undiverted.

This arrangement allows automatic diversion to the remote number of all calls made to the "primary number" of the handset 3a whenever the handset 3a is out of range of the base station 2, and the cancellation of such diversions when the handset comes within range of the base station 2, without any need for manual input by the user. Indeed the user need not be aware whether he is within or outside range of the base station 2.

The user input 15 may be used to programme that calls are only to be diverted by the controller 11 at certain times, by programming the controller 11 to override the indication from the detector at other times.

If it is desired that calls to a specified primary number (e.g. having a predetermined CNI) are to be selectively routed to the remote number, for example only if they have a specified category of CLI, and/or only if they are not answered by the handset 3b, the controller does not direct the call divert unit 14 to set up a call divert for all incoming calls. Instead, incoming calls are handled individually by the call processor 20, which can transfer incoming calls to other exchange lines if required. In this case it is only necessary to page the handsets when an incoming call attempt is made.

The operation of the call processor unit 20 and its peripherals will now be described.

The call processor unit 20 is configured by the control unit 11 to handle different types of incoming calls in different ways according to a number of inputs made at the time that the incoming call is made. These inputs are:

1) the time, as indicated by a clock 24,
2) the called number (i.e. primary or alternative) as determined by the called number indicator 22,
3) the calling line as indicated by the Calling Line Identifier 23.

The called number is identified by means of a ringing current detector 21, which detects the pulses of ringing current, and the pattern of this ringing current is transferred to the called number identifier 22 to determine which ringing cadence is being sent from the PSTN exchange 7, and therefore which of the directory numbers associated with the exchange line 6 has been dialled. In the present example, with two possible numbers, the called number identifier merely needs to identify whether the cadence is that dedicated to one of the numbers (e.g. the "primary number"); any other cadence must, by default, be that for the other number. The original purpose of providing different ringing sequences is to allow users to recognise which number has been dialled, and therefore to answer the call appropriately, and therefore in practice ringing sequences are selected which can be readily distinguished by human beings. However, provided that the ringing current detector 21 and called number identifier 22 can distinguish them, more subtle differences in ringing cadence may be used in the system of the invention.

The call processor 20 acts upon the various inputs, according to its programming, to transfer the call by means of the call transfer unit 26, if appropriate. If the call is not to be transferred, ringing current (with the appropriate cadence) may be applied to the equipment 3a, 3b, 4 and 5. The processor may be arranged to route the call only to the certain of these equipments. If no response is received from the selected equipment 3a, 3b, 4, 5, this fact is detected by a response detector 25. The response detector 25 counts the number of pulses of ringing current received, and if a predetermined number of pulses is reached instructs the call processor 20 to move to the next condition in the hierarchy.

The call transfer unit 26 transmits a message via the line 6 to the PSTN 7 instructing it to transfer the call to the remote number, for example the cellular number associated with the handset 3a.

On receiving an incoming call the call processor 20 first earths the connection 6 from the PSTN 7, using the earthing switch 30, which performs the same function as the 'R' or "recall" button on a conventional telephone in order to 'park' the call in the PSTN 7. In the event that the call is not to be answered at all, the connection simply remains "parked", until the caller hangs up.

It will be appreciated that other signals, such as a "loop disconnect", may be recognisable by the PSTN as a "recall" signal, and the earthing switch 30 may be replaced by a generator of any such signal recognisable by the PSTN with which the equipment is to work.

An additional feature of the call processor unit will now be described. This feature allows the caller 10, as well as the called party, to have a say in how the call is answered. From some or all categories of call, when the call processor unit 20 detects an incoming call having a specified CLI and CNI, and in accordance with the time of day, it answers the call (i.e. it goes "off-hook"), and instructs an option generator 27 to transmit a prompt to the caller 10. This prompt is a voice-generated "menu" offering the caller 10 certain options. These options are selected by the call processor unit 20 in accordance with the programming from the control unit 11. For example the options can be selected according to the individual call's CLI and CNI, the time of day and the presence or absence of the handsets 3a, 3b. The options generated by the option generator 27 are processed into a voice message by a caller prompt unit 28 for transmission over the PSTN 7 to the caller. The voice message invites the caller 10 to transmit a selection using voice commands or DTMF tones. The selection is received back from the caller 10 by way of the PSTN exchange 7 and exchange line 6 and is decoded by a DTMF decoder 29 to identify which of the offered options has been selected. The option selected is input into the call processor unit 20 from where the selected handset 3a, 3b, fixed telephone 4, or answering machine 5 is activated. In the event that the selected handset is not answered the response detector 25 causes the call processor unit 20 to either default to another condition as already described, or to return to the option generator 27 to offer a revised list of options, omitting the option which failed.

The call divert unit 14 and its output to the network 7 could be dispensed with, all incoming calls being handled by the call processor 20 instead, being transferred to the remote number if the CNI is appropriate. However, by setting up call diversion in the network when possible, instead of using the call transfer unit 26, such diverted calls can be connected more quickly, and without the need for the involvement of the user's call handling unit 1 or the exchange connection 6 for each call. In particular, it allows such calls to be diverted even if the exchange connection 6 is in use.

Other variations on these embodiments are also possible within the scope of the claims. For example, if the scheduling feature is not required, the clock 24 can be dispensed with. In this case, all call handling would be processed according to manual inputs and the detection (or otherwise) of handsets.

A further use of the incoming call data will now be described with reference to FIG. 4.

The apparatus illustrated in FIG. 4 generates a data message to send to a separate exchange line when a message is left on the answering machine 5. When an incoming call is made the call is routed to the answering machine 5, and possibly other terminals. If the call is answered by the answering machine 5 (e.g. because it is not intercepted by another terminal first) this is detected by the processor 40 which causes the data collection unit 41 to operate. The data collection unit 41 then detects the called and calling numbers using the inputs from the identifiers 22 and 23 and the time and duration of call as determined from the clock 24 and triggered by the start and finish of the connection to the answering machine 5. On termination of the connection to the answering machine 5, the data collected is transmitted to a data generator 42 which generates a data message according to a suitable protocol. This is transmitted to the service point 43 where it is re-formatted to the SMS (Short Message Service) format of GSM (Global System for Mobile Communications), for transmission by way of the cellular network 8, 9 to the user's cellular telephone 3a. In this way the user of the mobile unit 3a is advised that he has received an answering machine message, without having to answer the call immediately, or having to interrogate the answering machine remotely in order to determine whether a message has been left or not. Alternative data message protocols, e.g. for use with pagers, may be used.

The SMS Service Point 43 allows for re-formatting. If the data medium is compatible with the PSTN (and in particular the exchange line 6), the message can be routed directly to the mobile handset 3a. However, the use of a Service Point 43 also allows data messages to be stored if a handset is temporarily unavailable, for example because it is out of range, or switched off.

What is claimed is:

1. A telephone apparatus having:
   exchange connection means suitable for connection, by means of a telecommunications exchange line, to a telecommunications network;
   signal recognition means suitable for detecting and recognising a ringing pattern or cadence of signalling, associated with an incoming call, transmitted over the exchange line to the apparatus,
   call handling means for handling the incoming call according to the ringing pattern or cadence;
   at least one cordless handset connection means suitable for establishing wireless communication between the apparatus and at least one respective cordless handset;
   detection means for detecting the presence or absence of such cordless handsets, and
   programming means to change the correspondence between ringing patterns or cadences and handling process according to the presence or absence of the cordless handsets.

2. Telephone apparatus according to claim 1, wherein the call handling means includes means for transferring the incoming call to a second exchange line in response to the recognition of a predetermined ringing pattern or cadence.

3. Telephone apparatus according to claim 2, wherein the means for transferring an incoming call comprises means for transmitting a signal to the telecommunications network in order to disconnect the incoming call from the exchange line, and means for transmitting a signal over the exchange line to the telecommunications network, the signal being indicative of the second exchange line to which the incoming call is to be transferred.

4. Telephone apparatus according to claim 1, wherein the handling means includes means for causing a signal to be transmitted over the telephone network to a predetermined telephone connection in response to an incoming call.

5. A telephone apparatus according to claim 4 for connection to a telephone network and to a telephone answering machine, comprising means for causing an incoming telephone call to be handled by the telephone answering machine, and signal generation means for causing a signal to be transmitted over the telephone network to a predetermined receiving telephone connection in response to a call being routed to the machine.

6. Telephone apparatus according to claim 5, wherein the predetermined receiving telephone connection is a GSM-standard mobile telephone, and the signal generation means has means for generating a signal according to the GSM short message service (SMS) protocol for transmission to a GSM standard mobile telephone.

7. Telephone apparatus according to claim 5, wherein the signal generation means generates a signal indicative of any one or more of the calling party, the called number, the duration of the message, and the time at which the incoming call was made.

8. A telephone apparatus according to claim 1, including programming means for programming the call handling means such that the correspondence between signal characteristics and call handling selection can be varied, wherein the programming means includes caller control means, the caller control means comprising option selection means to select two or more handling options, selected according to the characteristics of the signalling received, message generation means for transmitting an option message over the exchange connection to the maker of an incoming call offering the options selected by the option selection means, detection means for detecting signals received from the exchange connection in response to the option message, and means for controlling the call handling selection means in response to the signals detected by the detection means.

9. A method of operating a telephone apparatus connected to a telephone network by means of an exchange line, wherein:
   on an incoming call attempt being made from the network, handling the call according to a selected one of a plurality of modes under the control of the apparatus according to which of a predetermined set of ringing patterns or cadences is transmitted form the network; and
   wherein the apparatus is associated with one or more removable handsets, and the correspondence between ringing patterns or cadences and handling process selection is varied according to the presence or absence of the removable handsets.

10. A method according to claim 9 wherein the ringing pattern or cadence is generated by the network and is indicative of which of a plurality of telephone numbers associated with the exchange line was used to make the call.

11. A method according to claim 9 wherein one or more of the handling modes is a transfer of the incoming call to a second exchange line.

12. A method according to claim 11, wherein one of the call handling modes transfers calls to another exchange line by transmitting a signal to the telecommunications network in order to disconnect the incoming call from the exchange line, and transmitting a signal over the exchange line to the telecommunications network, the signal being indicative of the second exchange line to which the call is to be transferred.

13. A method according to claim 9 wherein a signal is transmitted over the telephone network to a predetermined telephone connection in response to an incoming call.

14. A method according to claim 13 wherein calls may be handled by activation of a telephone answering machine, and a signal is generated for transmission over the telephone network to a predetermined telephone connection in response to a call being so handled by the answering machine.

15. A method according to claim 14, wherein the signal is generated according to the GSM short message service (SMS) protocol for transmission to a GSM standard mobile telephone.

16. A method according to claim 14 wherein the signal generated is indicative of any one or more of the calling party, the called number, the duration of the message, and the time at which the incoming call was made.

17. A method according to claim 9, wherein the removable handsets communicate with the apparatus by wireless means when in the presence of the apparatus.

18. A method according to claim 9, further comprising the steps of:

a) transmitting a message offering handling options to the calling party, the options offered being selected according to the characteristics of the signalling associated with the call attempt;

b) receiving handling instructions from the calling party; and c) handling the incoming call according to said handling instructions.

* * * * *

UNITED STATES PATENT AND TRADEMARK OFFICE
CERTIFICATE OF CORRECTION

PATENT NO.    : 6,192,231 B1
DATED         : February 20, 2001
INVENTOR(S)   : Chapman et al.

It is certified that error appears in the above-identified patent and that said Letters Patent is hereby corrected as shown below:

<u>Title page,</u>
Item [30] change "GB" (both occurrences) to -- EP --.

Signed and Sealed this

Second Day of October, 2001

*Attest:*

NICHOLAS P. GODICI
*Attesting Officer*   *Acting Director of the United States Patent and Trademark Office*